United States Patent Office

3,431,324
Patented Mar. 4, 1969

3,431,324
FLAME-RETARDANT AGENTS FOR
THERMOPLASTIC PRODUCTS
Helen Currier Gillham, Princeton, N.J., and Allan Ellis Sherr, Norwalk, Conn., assignors to American Cyanamid Company, Stamford, Conn., a corporation of Maine
No Drawing. Original application July 30, 1963, Ser. No. 298,577, now Patent No. 3,309,425, dated Mar. 14, 1967. Divided and this application Oct. 28, 1966, Ser. No. 590,230
U.S. Cl. 260—893        6 Claims
Int. Cl. C09k 3/28; C07c 29/02, 29/04

ABSTRACT OF THE DISCLOSURE

Thermoplastic polymers having improved flame-retardant properties are prepared by blending therewith minor amounts of a tributylvinylphosphonium bromide or iodide.

---

This application is a divisional application of copending application Ser. No. 298,577, filed July 30, 1963, now U.S. Patent No. 3,309,425.

This invention relates to flame-retardant compositions. More particularly, this invention relates to flame-retardant compositions comprising thermoplastic polymers containing a flame-retarding amount of a phosphonium salt. Still more particularly, this invention relates to novel flame-retardant compositions comprising thermoplastic polymers containing a flame-retarding amount of a phosphonium salt comprising:

(A) those having the formula (I)  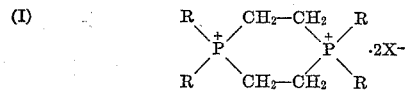

wherein R is a saturated, branched or straight chain alkyl radical of from 1 to 8 carbon atoms, inclusive, and X is a bromine or iodine radical, (B) 1,3,5,7,10,10 - hexamethyl - 2,6,9 - trioxa - 10-phosphoniatricyclo[3.3.1.1$^{3,7}$]decane iodide, (C) Ethyltriphenylphosphonium ethyl sulfate or (D) Homopolymers of compounds having the formula (II)   $(CH_3CH_2CH_2CH_2)_3$—$P^+$—$CH=CH_2$  $\cdot Y^-$ wherein Y is a bromine or iodine radical.

The use of various materials incorporated into thermoplastic resins in order to improve the flame retardance thereof has been known in the prior art. Many compounds are commercially available for such a use, among them being chlorostyrene copolymers, chlorinated paraffin wax in admixture with triphenyl stibine, chlorinated paraffins and aliphatic antimonyl compounds, as well as antimony oxide-chlorinated hydrocarbon mixtures. A drawback of these compounds, however, has been the fact that generally a large amount, i.e., upwards of 35%, of additive must be incorporated into the resin in order to make it sufficiently flame retardant. Also these prior art additives tend to crystallize or oil out of the resin after a relatively short time of incorporation. We have now found a group of compounds which may be added to thermoplastic resins in relatively small amounts and still result in the production of satisfactory flame retardant compositions and which will not crystallize or oil out of the resin after incorporation therein.

The production of thermoplastic resin compositions which are flame retardant, i.e., have high resistance to heat, is of considerable commercial importance. For example, such articles as castings, moldings, foamed or laminated structures and the like are required, or at least desired, to be resistant to fire and flame and to possess the ability to endure heat without deterioration. Typical illustrations of such applications can be found in castings for live electrical contacts which should not be ignited or deteriorated by heat and sparks. Structural members such as pipes, wall coverings, wall paneling, windows and items such as ash trays, waste baskets, fibers and the like are further examples of products wherein flame retardance is desirable.

It is therefore an object of the present invention to provide novel flame retardant thermoplastic resin compositions.

It is a further object of the present invention to provide flame retardant compositions comprising thermoplastic polymers and a flame-retarding amount of a phosphonium salt comprising those compounds designated above as A to D.

These and further objects will become more apparent to those skilled in the art upon reading the more detailed description set forth hereinbelow.

THE THERMOPLASTIC POLYMERS

The thermoplastic polymers into which the flame retardant agents may be incorporated to produce the novel compositions of the present invention, are generally the vinyl type polymers wherein the monomeric material is polymerized, by any known method, via the vinyl unsaturation therein. Additionally, thermoset type materials may be employed such as the polyester resins, polyurethanes, and the like. Examples of the vinyl type polymers which may be used to form our novel compositions are the vinyl halides, the vinylidene halides, the vinyl acetates, polyvinyl butyral, butadiene copolymers, acrylonitrile-butadiene-styrene polymers, the acrylonitriles, etc. Additionally and preferably, one may incorporate the flame retardant agents mentioned above into such polymers as the α-olefin polymers, such as the homopolymers and copolymers etc. containing, as the major constituent, ethylene, propylene, and the like and the acrylates and methacrylate polymers produced from monomers having the formula (II)   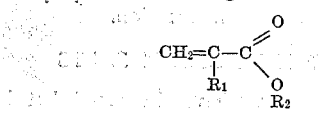

wherein $R^1$ is a hydrogen or methyl radical and $R^2$ is a hydrogen or an alkyl radical having from 1 to 6 carbon atoms, inclusive. Examples of monomers represented by Formula II include methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate and their corresponding alkyl methacrylates.

Additional examples of monomers which may be used to form the thermoplastic vinyl polymers encompassed by the present invention, polymerized either singularly or in combination with each other or with the other compounds set forth hereinabove, are such monomers as the unsaturated alcohol esters, more particularly the allyl, methallyl, vinyl, methvinyl, butenyl, etc., unsaturated esters of aliphatic and aromatic monobasic acids such, for instance, as acetic, propionic, butyric, crotonic, succinic, glutaric, adipic, maleic, fumaric, itaconic, benzoic, phthalic, terephthalic, benzoylphthalic, etc., acids; the saturated monohydric alcohol esters, e.g., the methyl, ethyl, propyl, isopropyl, butyl, sec.-butyl, amyl, etc., esters of ethylenically unsaturated aliphatic monobasic acids, illustrative examples of which appear above; vinyl cyclic compounds (including monovinyl aromatic hydrocarbons), e.g., styrene, o-, m-, and p-chlorostyrenes, -bromostyrenes, -fluorostyrenes, -methylstyrenes, -ethylstyrenes, -cyanostyrenes, the various poly-substituted styrenes such, for example, as the various di-, tri-, and tetra-chlorostyrenes, -bromostyrenes, -fluorostyrenes, -methylstyrenes, -ethylstyrenes, -cyanostyrenes, etc., vinyl pyridine, divinyl benzene, diallyl benzene, the various allyl cyanostyrenes, the various alpha-substituted styrenes and alpha-substituted ring-substituted styrenes, e.g., alpha-methylstyrene, alpha-methyl-para-methylstyrene, etc.; unsaturated ethers, e.g., ethyl vinyl ether, diallyl ether, etc.; unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; unsaturated ketones, e.g., methyl vinyl ketone, methyl allyl ketone, etc.; methylene malonic esters, e.g., methylene methyl malonate, etc. and ethylene.

Other examples of monomers that can be used as polymers to form the resin portion of our novel flame-retardant compositions are the vinyl halides, more particularly, vinyl fluoride, vinyl chloride, vinyl bromide, and vinyl iodide, and the various vinylidene compounds, including the vinylidene halides, e.g., vinylidene chloride, vinylidene bromide, vinylidene fluoride, and vinylidene iodide, other comonomers being added, if needed, in order to improve the compatibility and copolymerization characteristics of the mixed monomers.

More specific examples of allyl compounds that can be polymerized to useful polymers, useful in the production of our novel flame-retardant compositions, are allyl alcohol, methallyl alcohol, diallyl carbonate, allyl lactate, allyl alphahydroxyisobutyrate, allyl trichlorosilane, diallyl phthalate, diallyl methylguconate, diallyl tartronate, diallyl tartrate, diallyl mesaconate, the diallyl ester of muconic acid, diallyl chlorophthalate, diallyl dichlorosilane, the diallyl ester of endomethylene tetrahydrophthalic anhydride, triallyl tricarballylate, triallyl cyanurate, triallyl citrate, triallyl phosphate, tetrallyl silane, tetrallyl silicate, hexallyl disiloxane, allyl diglycol carbonate, etc. Other examples of allyl compounds that may be employed are given, for example, in U.S. Patent No. 2,510,503, issued June 6, 1950.

These above mentioned monomers may be polymerized, copolymerized, etc., in any known manner such as by free-radical generating catalysts, irradiation, anion and cation type catalysts and the like, said method of polymerization forming no part of the present invention.

THE PHOSPHONIUM SALTS

As mentioned above, we have discovered that the addition of certain phosphonium salts, stable to processing conditions, to a thermoplastic resin results in the production of resinous compositions having excellent flame-retardant properties. These phosphonium salts may be incorporated into the resins in flame-retarding amounts, i.e. generally amounts ranging from about 10%, by weight, to about 35%, by weight, preferably 15% to 25%, by weight, based on the weight of the polymer, have been found sufficient.

The phosphonium salts can be incorporated into the resins by any known method. That is to say, the flame retardant phosphonium salt additive may be added to the resin by milling the resin and the salt on, for example, a two-roll mill, in a Banbury mixer etc., or the salt may be added by molding the salt and resin simultaneously, extruding the salt and resin or by merely blending the resin in powder form with the salt and thereafter forming the final desired article. Additionally, the phosphonium salt may also be added during the resin manufacture, i.e., during the polymerization procedure by which the resin is made, provided the catalyst etc. and other ingredients of the polymerization system are inert to the phosphonium salt.

The phosphonium salts set forth hereinabove may be produced in any known manner without varying from the scope of the present invention. Exemplary procedures for the production of compounds represented as A, B, C and D above are as follows:

(A) Generally, these compounds can be produced by the reaction of a secondary phosphine having the formula

with a vinyl halide of the formula $$CH_2=CHX$$

wherein R and X are as defined above in regard to Formula I. The reaction is conducted in the presence of a free radical-generating initiator which is nonoxidizing with respect to the secondary phosphine, and at a temperature ranging from about 120° C. to about 200° C. for more than one hour, i.e. 4 to 5 hours. More specific details of such a method of production are set forth, for example, in copending U.S. patent application, Ser. No. 53,902, filed Sept. 6, 1960, now U.S. Patent No. 3,206,496.

Examples of compounds which are represented by Formula I and are therefore useful as flame retardants in producing the novel compositions of the present invention include 1,1,4,4-tetraoctyl-1,4-diphosphoniacyclohexanediiodide,
1,1,4,4-tetraoctyl-1,4-diphosphoniacyclohexanedibromide,
1,1,4,4-tetraheptyl-1,4-diphosphoniacyclohexanediiodide,
1,1,4,4-tetraheptyl-1,4-diphosphoniacyclohexanedibromide,
1,1,4,4-tetrahexyl-1,4-diphosphoniacyclohexanediiodide,
1,1,4,4-tetrahexyl-1,4-diphosphoniacyclohexanedibromide,
1,1,4,4-tetrapentyl-1,4-diphosphoniacyclohexanediiodide,
1,1,4,4-tetrapentyl-1,4-diphosphoniacyclohexanedibromide,
1,1,4,4-tetra-n-butyl-1,4-diphosphoniacyclohexanediiodide,
1,1,4,4-tetra-n-butyl-1,4-diphosphoniacyclohexanedibromide,
1,1,4,4-tetra-t-butyl-1,4-diphosphoniacyclohexanediiodide,
1,1,4,4-tetra-t-butyl-1,4-diphosphoniacyclohexanedibromide,
1,1,4,4-tetraisobutyl-1,4-diphosphoniacyclohexanediiodide,
1,1,4,4-tetraisobutyl-1,4-diphosphoniacyclohexanedibromide,
1,1,4,4-tetra-n-propyl-1,4-diphosphoniacyclohexanediiodide,
1,1,4,4-tetra-n-propyl-1,4-diphosphoniacyclohexanedibromide,
1,1,4,4-tetraisopropyl-1,4-diphosphoniacyclohexanediiodide,
1,1,4,4-tetraisopropyl-1,4-diphosphoniacyclohexanedibromide,
1,1,4,4-tetraethyl-1,4-diphosphoniacyclohexanediiodide,
1,1,4,4-tetraethyl-1,4-diphosphoniacyclohexanedibromide,
1,1,4,4-tetramethyl-1,4-diphosphoniacyclohexanediiodide,
1,1,4,4-tetramethyl-1,4-diphosphoniacyclohexanedibromide,
1,1,4,4-tetra(2-ethylhexyl)-1,4-diphosphoniacyclohexanediiodide,
1,1,4,4-tetra(2-ethylhexyl)-1,4-diphosphoniacyclohexanedibromide and the like.

(B) 1,3,5,7,10,10 - hexamethyl - 2,6,9 - trioxa-10-phosphoniatricyclo[3.3.1.1$^{3,7}$]decane iodide may be produced by the reaction of 1,3,5,7 - tetramethyl-2,6,9-trioxo-10- phosphatricyclo[3.3.1.1³,⁷]decane with methyl iodide by refluxing for about 18 hours. More specific details of the production of this compound can be found, for example, in U.S. Patent No. 3,026,327, issued Mar. 20, 1962.

(C) Ethyltriphenylphosphonium ethyl sulfate may be produced by heating triphenylphosphine with diethyl sulfate in a refluxing solvent such as acetonitrile for about 8 hours. The compound is then recovered, by evaporation of the solvent, in yields up to about 50% to 100% of theoretical.

(D) The homopolymers of tributylvinylphosphonium iodide and bromide have the structural formula (III)

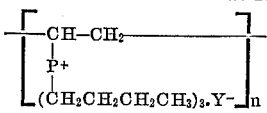

wherein $n$ is the number of recurring units in the polymer and Y is as defined above. These homopolymers may be produced by subjecting aqueous solutions of the tributylvinylphosphonium monomer to dosage units of radiation or by contacting the monomer with nonoxidizing free-radical generating catalysts under various conditions. More specific details in regard to these procedures are set forth in U.S. Patent No. 3,294,764, issued Dec. 27, 1966.

Monomers which may be used to produce the homopolymers represented by Formula III include tributylvinylphosphonium bromide and tributylvinylphosphonium iodide.

It should be understood, however, that none of the above enumerated procedures form part of the present invention.

It should be noted that it is also within the scope of the present invention to incorporate such ingredients as plasticizers, dyes, pigments, stabilizers, antioxidants, antistatic agents and the like to our novel compositions.

The following examples are set forth for purposes of illustration only and are not to be construed as limitations on the present invention except as set forth in the appended claims. All parts and percentages are by weight unless otherwise specified.

Any appropriate flame retardance test may be used to determine the flame retardance properties of any specific compound. One test which is reasonably efficient is that designated as a modified version of ASTM test D635–56T. The specifications for this test are: a specimen, 5" in length, 0.5" in width and 0.045" in thickness, is marked at the 1" and 4" lengths and is then supported with its longitudinal axis horizontal and its transverse axis inclined at 45° to the horizontal. A Bunsen burner with a 1" blue flame is placed under the free end of the strip and is adjusted so that the flame tip is just in contact with the strip. At the end of 30 seconds, the flame is removed and the specimen is allowed to burn. If the specimen does not continue to burn after the first ignition it is immediately recontacted with the burner for another 30 second period. If, after the two burnings, the strip is not burned to the 4" mark, the specimen is designated as "self-extinguishing" or "flame-retardant."

Example 1

Eighty (80) parts of polyethylene and 20 parts of 1,1,4,4 - tetraoctyl - 1,4 - diphosphoniacyclohexane diiodide are milled together on a two roll mill at about 170° C. The resulting milled composition is molded into strips 5" in length, 0.5" wide and 0.45" in thickness and said strips are then subjected to an art recognized flame-retardance test. The strips pass the test and are therefore designated as flame-retardant.

Following the procedure of Example 1, the following examples were carried out utilizing other flame retardant agents and various thermoplastic resin polymers. The results of these examples are set forth in Table I below. In each instance the resultant plastic phosphonium salt mixture passed the flame retardance test and was designated as flame and fire retardant. In the table PE=polyethylene; PP=polypropylene; PMMA=poly(methyl methacrylate); PA=poly(acrylic acid); AN=acrylonitrile; ST=styrene and BD=butadiene.

TABLE I

| Example | Thermoplastic | Flame retardant | Percent |
|---|---|---|---|
| 2 | PP | 1,1,4,4-tetraoctyl-1,4-diphosphoniacyclohexane diiodide | 25 |
| 3 | Mixture of BD-AN (10-75%) and AN-ST (25-90%).* | do | 25 |
| 4 | PE | 1,1,4,4-tetraoctyl-1,4-diphosphoniacyclohexane dibromide | 30 |
| 5 | PA | do | 30 |
| 6 | PE | 1,1,4,4-tetramethyl-1,4-diphosphoniacyclohexane diiodide | 25 |
| 7 | PE | 1,1,4,4-tetra-n-butyl-1,4-diphosphoniacyclohexane diiodide | 25 |
| 8 | PP | do | 30 |
| 9 | PE | 1,1,4,4-tetraisopropyl-1,4-diphosphoniacyclohexane diiodide | 25 |
| 10 | PE | 1,3,5,7,10,10-hexamethyl-2,6,9-trioxa-10-phosphoniatricyclo[3.3.1.1³,⁷]decane iodide | 10 |
| 11 | PP | do | 20 |
| 12 | Mixture of BD-AN (10-75%) and AN-ST (25-90%).* | do | 25 |
| 13 | PMMA | Ethyltriphenylphosphonium ethyl sulfate | 25 |
| 14 | Mixture of BD-AN (10-75%) and AN-ST (25-90%).* | do | 25 |
| 15 | PE | Poly(tributylvinylphosphonium bromide) | 20 |
| 16 | PP | do | 20 |
| 17 | Mixture of BD-AN (10-75%) and AN-ST (25-90%).* | do | 25 |
| 18 | PE | Poly(tributylvinylphosphonium iodide) | 15 |
| 19 | PP | do | 15 |

*U.S. Patent No. 2,439,202.

We claim:

1. A flame-retardant composition comprising a thermoplastic polymer produced from at least one ethylenically unsaturated monomer and a flame retarding amount of a homopolymer of a compound having the formula $(CH_3CH_2CH_2CH_2)_3-P^+-CH=CH_2 \cdot Y^-$ wherein Y is selected from the group consisting of bromine and iodine radicals.

2. A flame-retardant composition according to claim 1 wherein said thermoplastic polymer is a polymer of an α-olefin.

3. A flame-retardant composition according to claim 1 wherein said thermoplastic polymer is polyethylene.

4. A flame-retardant composition according to claim 1 wherein said compound is tributylvinylphosphonium bromide.

5. A flame-retardant composition according to claim 1 wherein the thermoplastic polymer is a polymer of a compound having the formula

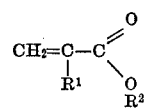

wherein R¹ is selected from the group consisting of hydrogen and a methyl radical and $R^2$ is selected from the group consisting of hydrogen and an alkyl radical having from 1–6 carbon atoms, inclusive.

6. A flame retardant composition according to claim 1 wherein the thermoplastic polymer is a mixture of (A) a butadiene-acrylonitrile copolymer and (B) an acrylonitrile-styrene copolymer, the amount of A and B ranging from about 10–75% to 90–25%, respectively.

References Cited

UNITED STATES PATENTS

| | | | |
|---|---|---|---|
| 3,054,698 | 9/1962 | Wagner | 260—45.7 |
| 3,294,764 | 12/1966 | Pellon et al. | 260—80 |

MURRAY TILLMAN, *Primary Examiner.*

M. J. TULLY, *Assistant Examiner.*

U.S. Cl. X.R.

260—80, 857, 859, 873, 874, 887, 897, 898, 895, 899, 901, 45.7